(12) United States Patent
Kim et al.

(10) Patent No.: US 8,117,522 B2
(45) Date of Patent: Feb. 14, 2012

(54) SPHERE DECODER AND DECODING METHOD THEREOF

(75) Inventors: Seong-Rag Kim, Daejeon (KR); Seung-Joon Lee, Daejeon (KR); Dong-Seung Kwon, Daejeon (KR); Seong-Keun Oh, Suwon (KR); Hee-Goo Han, Suwon (KR)

(73) Assignees: Samsung Electronics Co., Ltd., Suwon-si (KR); Electronics and Telecommunications Research Institute, Daejeon (KR); KT Corporation, Seongnam (KR); SK Telecom Co., Ltd, Seoul (KR); KTFreetel Co., Ltd., Seoul (KR); Hanaro Telecom, Inc., Seoul (KR)

( * ) Notice: Subject to any disclaimer, the term of this patent is extended or adjusted under 35 U.S.C. 154(b) by 985 days.

(21) Appl. No.: 11/722,131

(22) PCT Filed: Dec. 21, 2005

(86) PCT No.: PCT/KR2005/004423
§ 371 (c)(1),
(2), (4) Date: Apr. 4, 2008

(87) PCT Pub. No.: WO2006/068414
PCT Pub. Date: Jun. 29, 2006

(65) Prior Publication Data
US 2008/0313252 A1    Dec. 18, 2008

(30) Foreign Application Priority Data

Dec. 21, 2004  (KR) .................. 10-2004-0109421
Jun. 7, 2005   (KR) .................. 10-2005-0048374

(51) Int. Cl.
*H03M 13/03* (2006.01)

(52) U.S. Cl. ........................... 714/794; 375/346
(58) Field of Classification Search ............ 714/794; 375/346
See application file for complete search history.

(56) References Cited

U.S. PATENT DOCUMENTS 7,233,634 B1 *  6/2007  Hassell Sweatman et al. ............ 375/346

OTHER PUBLICATIONS

Emanuele Viterbo, et al. "A Universal Lattice Code Decoder for Fading Channels." IEEE Transactions of Information Theory, vol. 45, No. 5. pp. 1639-1642. Jul. 1999.
Babak Hassibi, et al. "On the Expected Complexity of Sphere Decoding." IEEE. pp. 1051-1055. 2001.

(Continued)

Primary Examiner — Sam Rizk
(74) Attorney, Agent, or Firm — Jefferson IP Law, LLP

(57) ABSTRACT

A sphere decoder sets a Euclidean distance between a lattice vector obtained by using an MMSE or ZF estimate and a received signal as an initial radius, further reduces the initial radius, and searches lattices points included inside a hypersphere with the further reduced initial radius. In addition, one lattice vector having a minimum Euclidean distance is output. One dimension is selected to reduce an initial radius, and estimates in other dimensions are kept fixed, excluding the selected dimension. Then candidate lattice points are searched in the selected dimension, excluding a current estimate, such that a minimum Euclidean distance and a lattice point estimate corresponding to the minimum Euclidean distance are obtained. The initial radius is updated by the minimum Euclidean distance, and a final lattice vector is constructed by combining a lattice point estimate corresponding to the initial radius and the lattice point estimates in other dimensions.

12 Claims, 7 Drawing Sheets

OTHER PUBLICATIONS

Wanlun Zhao, et al. "Sphere Decoding Algorithms With Improved Radius Search." IEEE Communications Society. pp. 2290-2294. 2004.

Harvind Samra et al. "Sphere Decoding for Retransmission Diversity in Mimo Flat-fading Channels." IEEE. pp. 585-588. 2004.

Tao Cui et al. "An Efficient Generalized Sphere Decoder for Rank-deficient MIMO Systems." IEEE. pp. 3689-3693. 2004.

Yongtao Wang et al. "Reduced-complexity Sphere Decoding Via Detection Ordering for Linear Multi-input Multi-output Channels." IEEE. pp. 30-35. 2004.

Tao Cui et al. "Approximate ML Detection for MIMO Systems Using Multistage Sphere Decoding." IEEE. pp. 1054-1056. 2004.

* cited by examiner

SPHERE DECODER AND DECODING METHOD THEREOF

TECHNICAL FIELD

The present invention relates to a radius reduction method to reduce computational complexity of a sphere decoder simultaneously detecting a plurality of lattice symbols in a communication system.

BACKGROUND ART

Generalization of telecommunication services have resulted in a rapid increase of demands for various communication services, for example, voice services, multimedia services, and Internet services requiring high data rates and communication quality through wired and wireless communication. Thus, it is important to develop physical layer technologies for providing high-rate transmission and reliable communication services to thereby satisfy such an increasing need of various users.

Among other various methods, a maximum likelihood (ML) detector satisfies the increasing need by simultaneously detecting a plurality of transmit symbols and providing optimal performance. However, the ML detector detects a transmit symbol that has a minimum Euclidean distance to a received signal from combinations of transmit symbols that can be transmitted, and accordingly, computational complexity of the ML detector exponentially increases according to the number of modulation levels and the number of transmit antennas. In particular, the computational complexity becomes severe because a detection process gets more complex when a large number of modulation levels is used and a great number of transmit antenna are used, and accordingly a use of the ML detector seems to be impossible.

Therefore, a sphere decoder is proposed to significantly reduce the computational complexity of the ML detector. In contrast to the ML detector, the search space of the sphere decoder is confined within a hypersphere with a given radius, centered at a received signal vector and the sphere decoder searches lattice vectors included inside the hypersphere, thereby reducing the complexity.

According to a sphere decoding method proposed by Viterbo ("A universal lattice code decoder for fading channels", IEEE Trans. Inform. Theory, vol. 45, pp. 1639-1642, July, 1999), an initial radius can be chosen using noise variances. However, a valid lattice vector could not be included inside the hypersphere with high probability, resulting in a decoding failure. When no lattice vector is included inside the hypersphere, an erasure would be declared or the search process would be repeated with a larger initial radius. This method is more advantageous over other decoding methods because it has low probability of a decoding failure and an initial radius can be chosen using a fading coefficient to prevent an extremely large number of lattice vectors from being included inside the hypersphere due to deep fading in the channel. When the decoding fails, the decoding process is repeated with a larger initial radius.

However, this may also increase computational complexity because an extremely large number of lattice vectors may be included inside the hypersphere when using the larger initial radius. Further, it becomes difficult to substantially detect an ML estimate when the erasure is declared. Therefore, the sphere decoding method proposed by Viterbo may not achieve an exact ML performance. In addition, although the fading coefficient is taken into account under the deep channel fading, time consumed for the decoding process may not be significantly reduced due to the computational complexity.

On the other hand, Hassibi proposed a sphere decoding method ("On the expected complexity of sphere decoding", Signals, Systems and Computers, 2001. Conference Record of the Thirty-Fifth Asilomar Conference, vol. 2, pp. 1051-1055 November 2001) to achieve the exact ML performance. According to Hassibi, a Euclidean distance is determined between a ZF estimate, called the Babai estimate, and a received signal, and therefore the ZF estimate and at least one lattice vector are included inside the hypersphere.

That is, since the ML detector searches the closest lattice vector to a received signal, this method guarantees the exact ML performance. However, the ZF estimate is quite far from the ML estimate in terms of the Euclidean distance and the initial radius is set too large, and therefore, an extremely large number of lattice vectors are still included inside the hypersphere, thereby increasing computational complexity of the sphere decoder.

Recently, a sphere decoding method with an improved radius search has been proposed by Zhao ("Sphere decoding algorithm with improved radius search", IEEE Wireless Communications and Networking Conference 2004, vol. 4, pp. 2290-2294, March 2004.). According to this method, a statistical characteristic of noise power is taken into account when determining an initial radius. When an initial radius is too small to succeed in searching a lattice vector included inside a hypersphere with the initial radius, the initial radius is increased until at least one lattice vector is found inside the hypersphere in order to achieve the exact ML performance.

When searching a new lattice vector with the increased initial radius, information on newly searched lattice points are added and information on already searched lattice points remain as they are rather than being calculated again, thereby reducing a computation amount. In addition, an additional constraint is provided to reduce memory consumption for storing information. In addition, lattice point searching order in the conventional tree-pruning process is modified such that the searching starts from a lattice point closest to the center of the radius, thereby significantly reducing the complexity.

Operation time is estimated in order to prove reduction of the complexity when using the increased radius, however, analysis of the computation amount is performed with consideration of the probabilistic characteristic of noise power and the number of lattice points that increases as the initial radius increases. Therefore, it is difficult to estimate the substantial amount of computation required for operation of the sphere decoder. In addition, the number of lattice vectors included inside the hypersphere exponentially increases as the initial radius increases, and thus an extremely large number of lattice vectors may be included inside the hypersphere. As a result, the complexity greatly increases.

As described, the complexity of the sphere decoder greatly depends on an initial radius and a method for searching lattice vectors included inside a hypersphere. That is, an extremely large number of lattice points may be included inside the hypersphere and the complexity increases when the initial radius is set too large, whereas a valid lattice point may not exist inside the hypersphere and thus an ML estimate may not be obtained when the initial radius is set too small.

In addition, although an Euclidean distance between a minimum mean square error (MMSE) estimate or a zero forcing (ZF) estimate and a received signal is set as an initial radius so that a plurality of valid lattice vectors exist within a hypersphere with the initial radius, the complexity increases because the initial radius is still too large and too many lattice vectors are included inside the hypersphere.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a sphere decoder and an initial radius reduction method for guaranteeing the existence of at least one lattice vector inside the hypersphere to obtain an ML estimate and reducing the number of lattice vectors included inside the radius, resulting in a great reduction in the overall complexity.

Technical Solution

In one aspect of the present invention, there is provided a sphere decoder for simultaneously detecting a plurality of symbols from a signal received through a communication channel. The sphere decoder includes an initial estimation unit, an initial radius setting unit, a lattice search unit, and a maximum likelihood estimation determining unit. The initial estimation unit obtains an initial estimate of a transmitted symbol vector from the received signal. The initial radius setting unit calculates a Euclidean distance between a lattice vector corresponding to the initial estimate of the symbol vector and the received signal and sets the Euclidean distance as an initial radius. The lattice search unit searches a set of candidate lattice vectors included inside a hypersphere with the initial radius, centered at the received signal vector. The maximum likelihood estimate determination unit selects a lattice vector having a minimum Euclidean distance from the set of candidate lattice vectors.

In another aspect of the present invention, there is provided a decoding method of a sphere decoder for simultaneously detecting a plurality of symbols from a signal received through a communication channel. In the method, an initial estimate of a symbol vector is obtained from the received signal, and a Euclidean distance is obtained between a lattice vector corresponding to the initial estimate and the received signal and the Euclidean distance is set as an initial radius. Further, a set of candidate lattice vectors included inside a hypersphere with the initial radius, centered at a received signal vector, are searched, and one lattice vector having a minimum Euclidean distance among the candidate of lattice vectors is selected.

Advantageous Effects

According to the present invention, an initial radius can be significantly reduces and the number of lattice vectors included inside a hypersphere with the initial radius can be efficiently reduced. Therefore, a computational complexity of the sphere decoder can be significantly reduced regardless of searching algorithms.

BEST MODE FOR CARRYING OUT THE INVENTION

Figure 1:
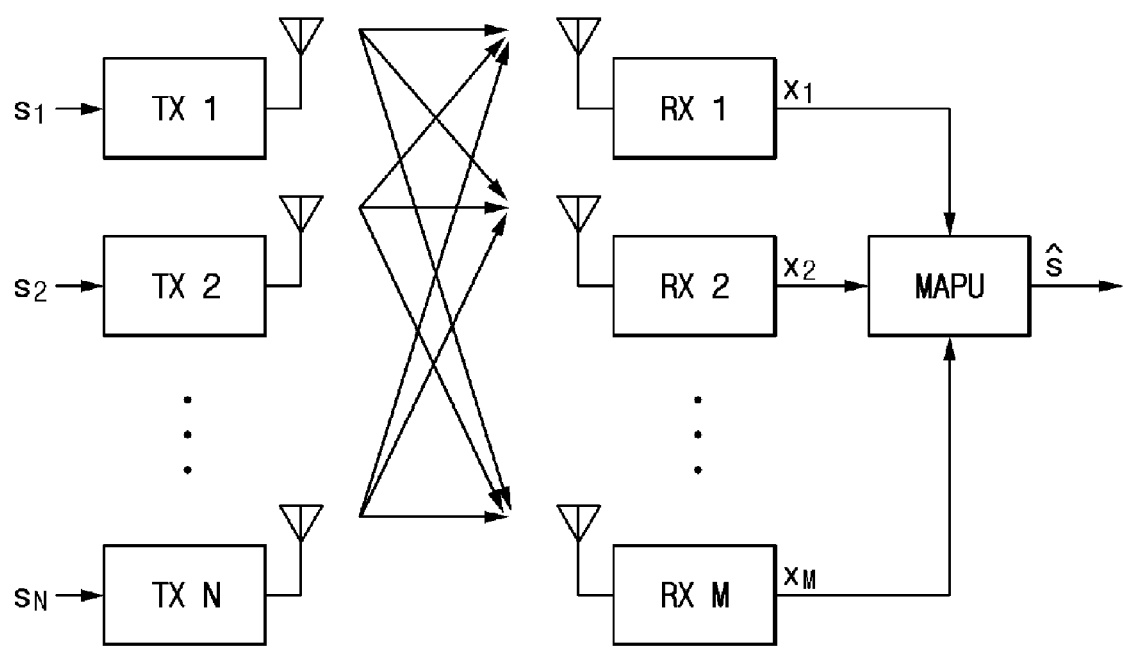
FIG. 1 shows a multi-input multi-output (MIMO) system according to an embodiment of the present invention.

An exemplary embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

A sphere decoder and a method for reducing an initial radius of the sphere decoder according to an exemplary embodiment of the present invention will now be described in more detail with reference to the accompanying drawings.

A transmitter simultaneously transmits a plurality of lattice-type symbols (hereinafter, referred to as a lattice vector) through a communication channel, and a receiver obtains independent signals equal to or greater than the number of symbols simultaneously transmitted from the transmitter according to an embodiment of the present invention. Therefore, the present invention may be applied to a system for simultaneously detecting a plurality of symbols.

FIG. 1 shows a multi-input multi-output (MIMO) system according to an embodiment of the present invention. In FIG. 1, N transmit antennas and M receive antennas are provided.

As shown in FIG. 1, the MIMO system simultaneously transmits N transmit symbols using a transmitter having N transmit antennas, respectively. Each transmit antenna transmits a different transmit symbol, and accordingly, an amount of data transmitted by the transmitter corresponds to the number of transmit antennas. A signal transmitted in such a way is received at the receive antenna through a channel H. The receiver simultaneously detects transmit symbols corresponding to the number of transmit antennas using M receive antennas. Herein, M is equal to or greater than N. At this time, the signal received at the receive antenna is to be a desired signal of the receive antenna, and, at the same time, to be an interference signal. Such a signal is processed through a multi-user receiver employing various algorithms such as Maximum Likelihood Detection (MLD), Zero Forcing (ZF), Minimum Mean Square Error (MMSE), Ordered Successive Interference Cancellation ZF-OSIC, and MMSE-OSIC, in a multi-antenna process unit (MAPU). H denotes a $M \times N$ channel matrix with a mean of zero and a complex Gaussian distribution value of 1, and M-dimensional vector $\tilde{n}$ denotes a complex additive white Gaussian noise (AWGN).

As described, assuming that the transmitter simultaneously transmits N transmit symbols having a Q-QAM constellation and the receiver receives M independent signals, a complex-valued signal model is given as Math FIG. 1.

$$r = \tilde{H} \cdot \tilde{x} + \tilde{n} \qquad \text{MathFigure 1}$$

where $\tilde{r}$ denotes an M×1 complex received signal vector, $\tilde{H}$ denotes an M×N complex channel matrix, $\tilde{x}$ denotes an N×1 complex transmit symbol vector, and $\tilde{n}$ denotes an M×1 complex white Gaussian noise vector.

Figure 2:
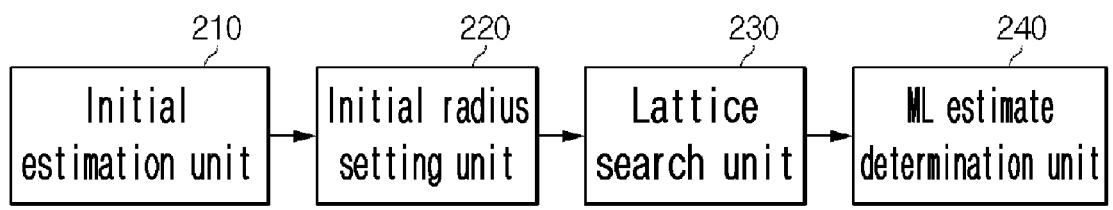
FIG. 2 illustrates a sphere decoder according to a first exemplary embodiment of the present invention.

For a real lattice representation, the complex received signal vector of Math Figure 1 may be transformed into the equivalent real-valued received signal vector as Math Figure 2.

$$r = H \cdot x + n \qquad \text{MathFigure 2}$$

where r denotes a

2M×1 real-valued received signal vector, H denotes a

2M×2N real-valued channel matrix, x denotes a

2N×1 real-valued transmit symbol vector, and n denotes

Figure 3:
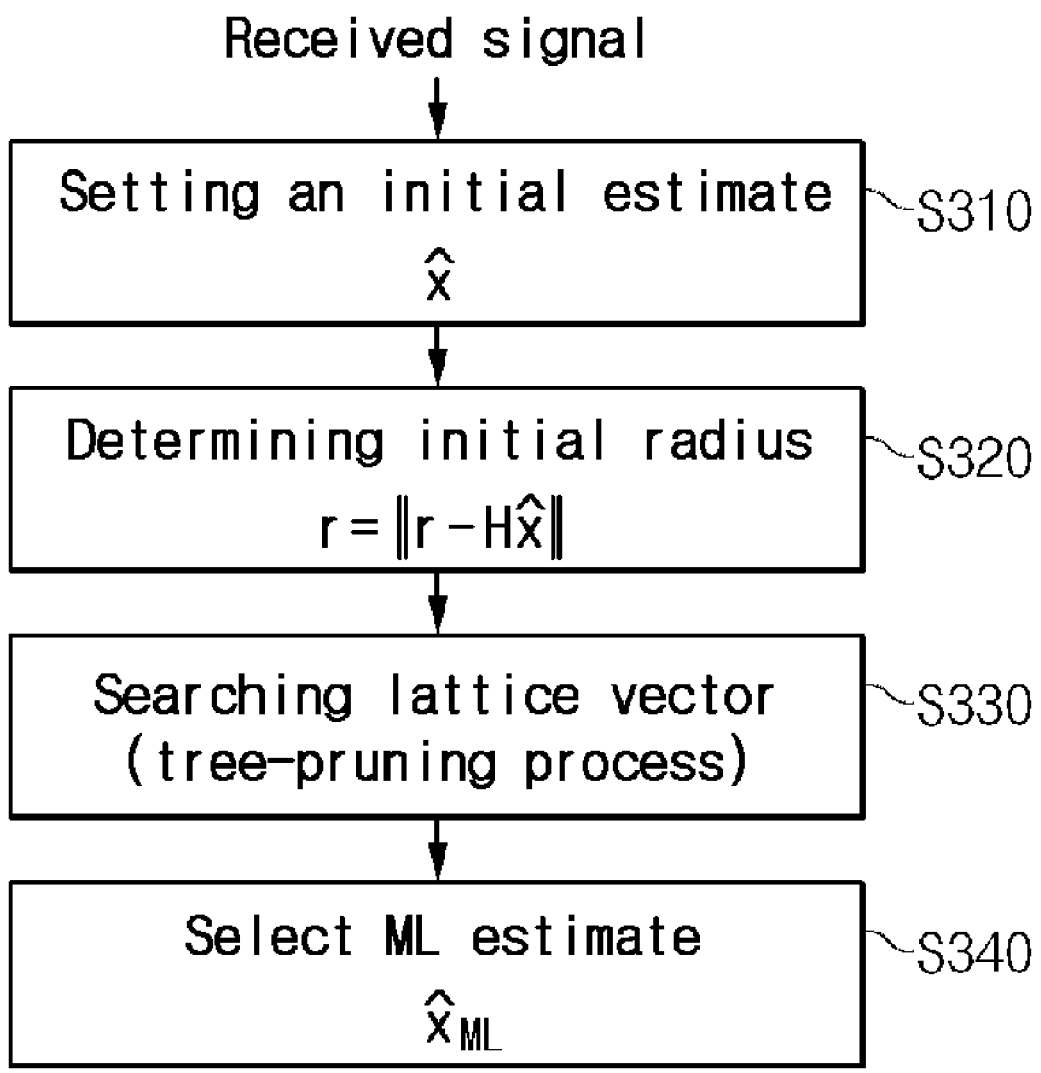
FIG. 3 illustrates an operation of the sphere decoder of FIG. 2.

2N×1 real-valued white Gaussian noise vectors, and each is given as Math Figure 3.

$$r = [\text{Re}(\tilde{r})^T \text{Im}(\tilde{r})^T]$$

$$H = \begin{bmatrix} \text{Re}(\tilde{H}) - \text{Im}(\tilde{H}) \\ \text{Im}(\tilde{H}) \text{Re}(\tilde{H}) \end{bmatrix}$$

$$x = [\text{Re}(\tilde{x})^T \text{Im}(\tilde{x})^T]$$

$$n = [\text{Re}(\tilde{n})^T \text{Im}(\tilde{n})^T]$$

where x is a 2N×1 real-valued transmit symbol vector. In this lattice representation, x can be interpreted as a symbol vector defined on a 2N-dimensional integer lattice $Z_q^{2N}$ with $q = \sqrt{Q}$.

For example, $Z_4 = \{-3, -1, 1, 3\}$ when using a 16-QAM 2-dimensional constellation with an average power of 10.

Figure 4:
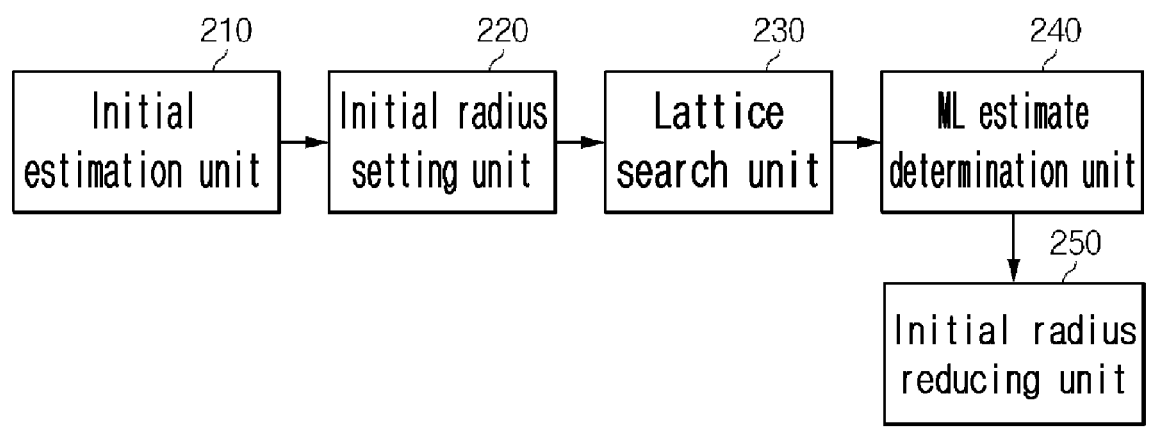
FIG. 4 shows a sphere decoder according to a second exemplary embodiment of the present invention.

A maximum likelihood (ML) detector estimates a lattice vector that satisfies a least square criterion on the 2N-dimensional finite lattice space shown in Math Figure 4 when the channel matrix H is known at the receiver.

$$\hat{x}_{ML} = \arg\min_x \|r - H \cdot x\|^2$$

The sphere decoder used for an efficient ML detection process searches lattice vectors included inside a hypersphere with an initial radius, centered at a received signal vector rather than searching lattice vectors included inside the entire 2N-dimensional finite space $Z_q^{2N}$ so that searching time can be significantly reduced.

FIG. 2 shows a sphere decoder according to a first exemplary embodiment of the present invention.

As shown in FIG. 2, the sphere decoder includes an initial estimation unit 210, and an initial radius setting unit 220, a lattice search unit 230, and a maximum likelihood (ML) estimate determination unit 240.

The initial estimation unit 210 obtains an initial estimate from a received signal vector.

The initial radius setting unit 220 determines an initial radius of a hypersphere for the sphere decoder.

The lattice search unit 230 searches a set of candidate lattice vectors included inside the hypersphere.

The ML estimate determination unit 240 selects a lattice vector having a minimum Euclidean distance from the candidate lattice vectors.

FIG. 3 illustrates an operation process of the sphere decoder of FIG. 2.

As shown in FIG. 3, the initial estimation unit 210 of the sphere decoder sets an MMSE estimate or a ZF estimate from the received signal vector as an initial estimate, performs QR-decomposition (QRD) of the channel matrix H, and obtains Q and R matrices in step S310.

Subsequently, the initial radius setting unit 220 determines an initial radius of the hypersphere for the sphere decoder in step S320. At this time, the initial radius setting unit 220 determines the initial radius by using two methods.

One of the two methods is to calculate noise power from the received signal and setting a radius that is proportional to a standard deviation of the noise. However, reduction of computation may not be achieved because the number of lattice vectors included inside the hypersphere increases when the radius is set large and a valid lattice vector may not be included inside the hypersphere when the radius is set small.

Another method is to obtain MMSE or ZF estimates using more simple computation compared to the ML estimate, and set a Euclidean distance between the received signal vector and a lattice vector corresponding to the initial estimate as an initial radius. The Euclidean distance is calculated using the obtained MMSE or ZF, and Math Figure 5. This method guarantees existence of at least one valid lattice vector inside the hypersphere.

$$r = \|r - H\hat{x}\| \qquad \text{MathFigure 5}$$

where an initial estimate $\hat{x}$ is a 2N-dimensional lattice vector of the MMSE estimate or ZF estimate.

When the initial radius is determined in such a way, a process for searching lattice vectors included inside the hypersphere and an ML estimate vector is required, wherein the ML estimate vector is a lattice vector having a minimum Euclidean distance to the received signal vector.

The lattice search unit 230 of the hypersphere decoder searches a set of candidate lattice vectors included inside the hypersphere in step S330. A tree-pruning process is typically used for searching lattice vectors included inside a hypersphere.

The tree-pruning process is performed from the highest dimension in a descending order to search for lattice vectors included inside the hypersphere with the initial radius, centered at the received signal vector, and computational complexity is reduced by deleting branches out of the hypersphere. In particular, when a valid lattice vector is found inside the hypersphere, a Euclidean distance between the valid lattice vector and the received signal vector is calculated. When the calculated Euclidean distance is smaller than a current initial radius, the calculated Euclidean distance is set to be a new initial radius such that the searching space of the hypersphere is reduced.

When all valid lattice vectors included inside the hypersphere are searched by repeatedly performing the above-described steps S310, S320, and S330, the ML estimate determination unit 240 selects a lattice vector having the minimum Euclidean distance with the received signal vector from the candidate lattice vectors. That is, the ML estimate determining unit 240 selects an ML estimate vector in step S340.

Performance of such a sphere decoder is determined by selecting an initial radius that determines the number of lattice vectors included inside the hypersphere and a tree-pruning process for searching an ML estimate vector inside the hypersphere. A sphere decoder employing a valid initial radius selection scheme will now be described with references to FIG. 4 to FIG. 7. For simplifying the tree-pruning process, the number of lattice vectors included inside the hypersphere is reduced according to the initial radius selection scheme.

Figure 5:
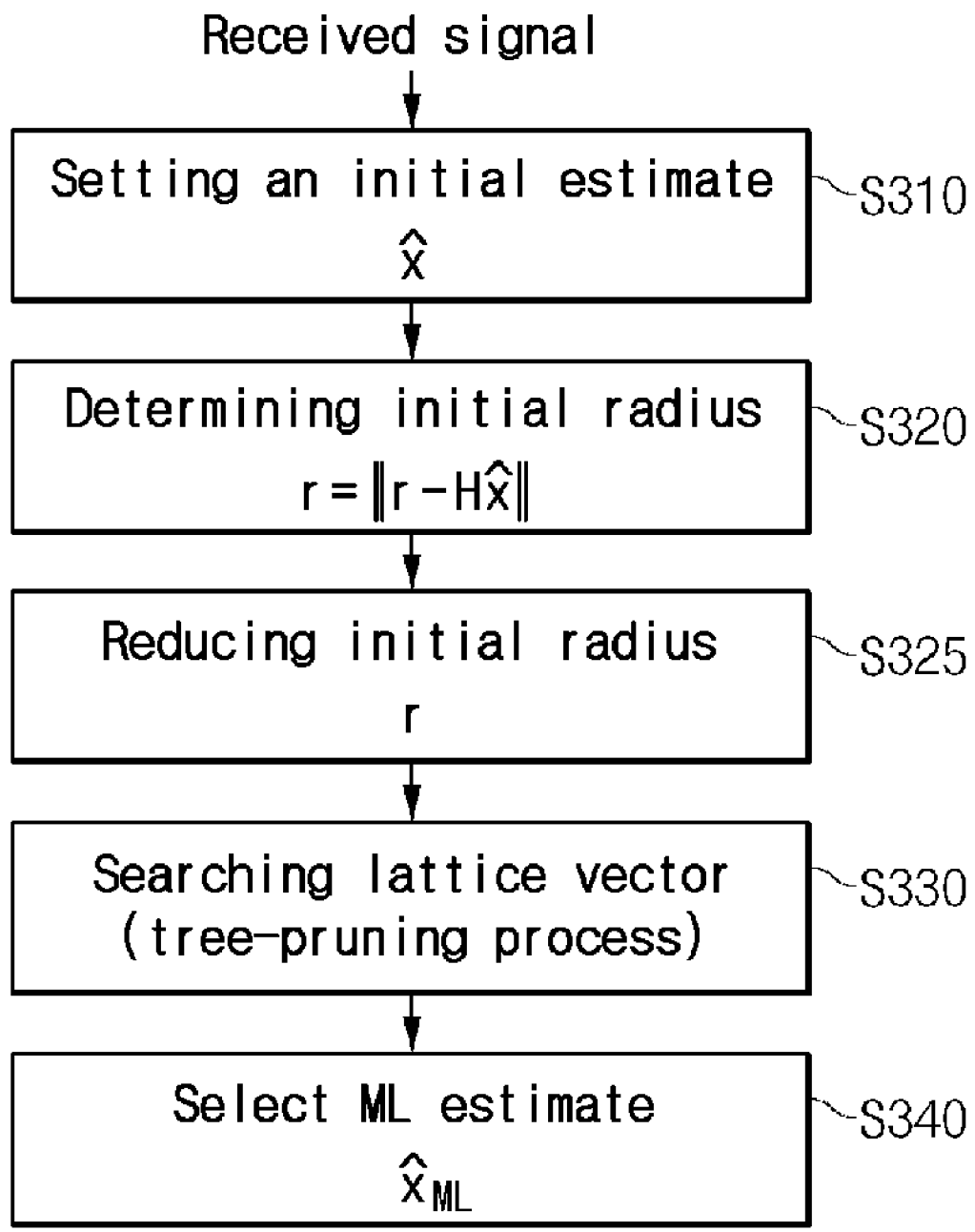
FIG. 5 illustrates an operation process of the sphere decoder of FIG. 4.
Figure 6:
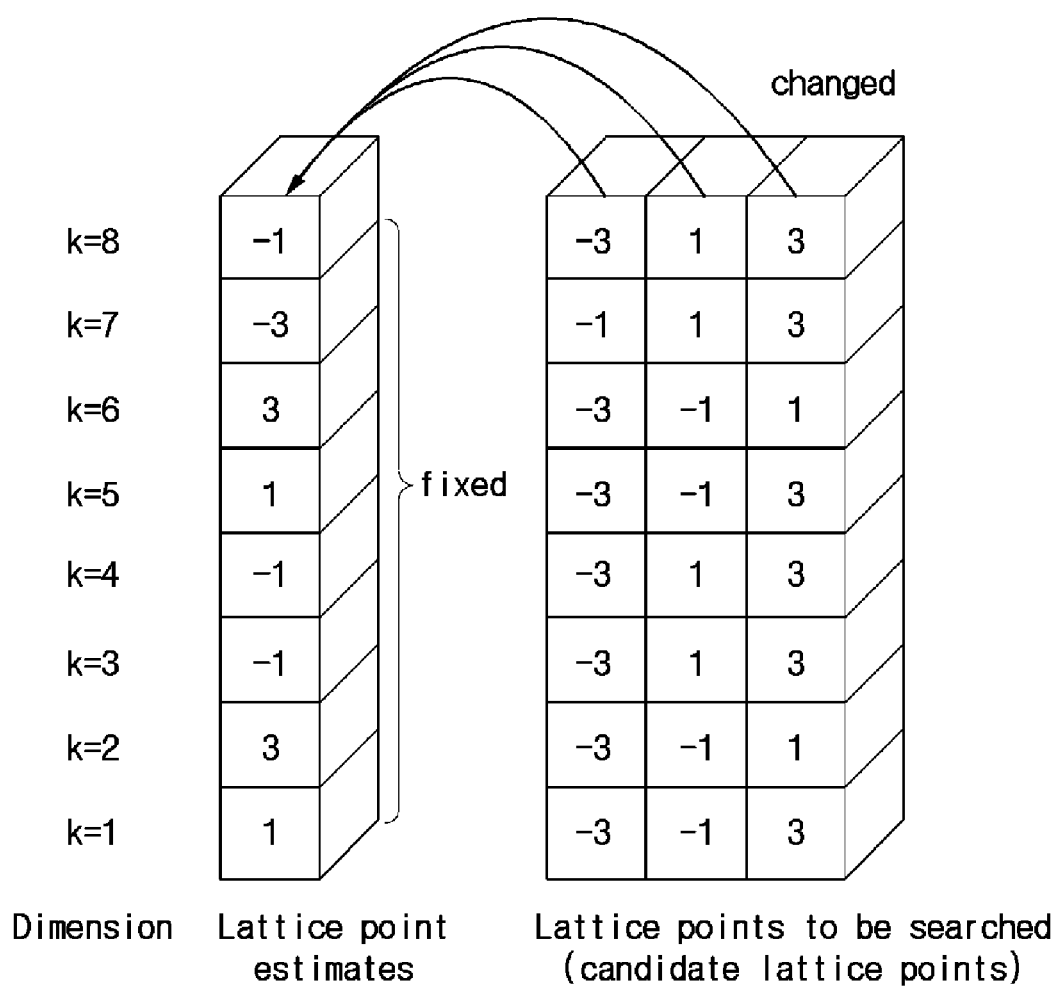
FIG. 6 shows a lattice point estimate in each dimension and a lattice point to be additionally searched by an initial radius reducing unit of FIG. 4.

FIG. 4 shows a sphere decoder according to a second exemplary embodiment of the present invention, and FIG. 5 illustrates an operation process of the sphere decoder of FIG. 4. FIG. 6 shows lattice point estimates at every dimension and lattice points to be further searched by an initial radius reducing unit of FIG. 4.

As shown in FIG. 4, the sphere decoder according to the second exemplary embodiment of the present invention further includes an initial radius reducing unit 250. Elements and operation processes that have already been shown in FIG. 2 and FIG. 3 will not be further described.

The initial radius setting unit 220 obtains an initial radius using an MMSE estimate or a ZF estimate, and the initial radius reducing unit 250 reduces the initial radius by performing a sequence of alternating one-dimensional search process.

That is, as shown in FIG. 5, after the initial radius setting unit 220 determines an initial radius of the hypersphere in step 320, the initial radius is further reduced in step S325 by performing the sequence of alternating one-dimensional searches using the determined initial radius before lattice vectors inside the hypersphere are searched in step S330. As described, the number of lattice vectors included inside the hypersphere may be reduced by the further reduced the initial radius such that computational complexity of the sphere decoder may be reduced.

The sequence of alternating one-dimensional search processes performed for further reducing the initial radius may be represented as in Algorithm 1. In the sequence of alternating one-dimensional search processes, an initial radius r and an MMSE estimate or ZF estimate is used as an initial estimate.

< Algorithm 1 >

Initialize($r, \hat{x}$)

For $i = 1$ to $2N$ $$(\hat{x}^u, r^u) = \begin{pmatrix} \arg\min_{x_i^u \in Z_q^{(i)}} \|r - H\hat{x}^{(i)}\|, \\ \|r - H\hat{x}^{(i)}\| \end{pmatrix}$$

If $r^u < r$, then $(r, \hat{x}) = (r^u, \hat{x}^u)$

End

In Algorithm 1, an MMSE or ZF estimate and an initial radius determined through Math FigureMath Figuresed for updating the initial radius.

First, a dimension is selected at a predetermined order. Kept fixed the estimates in all other dimension except for the selected dimension, a new estimate is found in the selected dimension, which as a minimum Euclidean distance from the received signal vector by searching over all the possible lattice points on $$Z_q^{(1)}.$$

Then $$\hat{x}^u$$

is obtained using a minimum radius $$r^u,$$

a lattice point $$\hat{x}_i^u$$

corresponding to the minimum radius $$r^u$$

in the selected dimension, and fixed lattice points of the unselected dimensions.

Assuming that the estimates of the unselected dimensions are kept fixed and a minimum radius obtained in the selected dimension is smaller than a current initial radius. In this assumption, the current initial radius and the current lattice vector are updated by the new radius (the minimum radius) and the corresponding lattice vector, respectively.

Subsequently, another dimension is selected and estimates of all other dimensions except for the selected dimension are kept fixed, and the above-described processes are repeated.

The initial radius reducing process is finished by continuing this alternating one-dimensional search process until from one dimension to all 2N dimensions are exhausted.

For an exemplary description of such a sequence of alternating one-dimensional search processes, assume that a communication system having four transmit antennas and four receive antennas and also having a 16-QAM constellation performs a sequence of alternating one-dimensional search processes from 1-dimension to 8-dimension. Herein, a ZF estimate is an 8-dimensional real-valued vector $$\hat{x}$$

$=[1,3,-1,-1,1,3,-3,-1]^T$, and an initial radius r is obtained using the ZF estimate. Lattice point estimates and a set of lattice points to be further searched at each dimension are as shown in FIG. 6. The respective dimensions with the corresponding lattice point estimates may be set at random order, as shown in FIG. 6. Herein, the lattice point to be further searched is called a candidate lattice point.

In the case of 1-dimension (first element of $$\hat{x}),$$

a current lattice point estimate is 1, and accordingly, a set of candidate lattice points becomes $$Z_4^{(1)}$$

$=\{-3, -1, 3\}$. At this time, lattice point estimates from 2-dimension (second element of $$\hat{x})$$

to 8-dimension (eighth element of $$\hat{x})$$

are kept fixed.

In the case of 1-dimension (first element of $$\hat{x},$$

a current lattice point estimate is 1, and accordingly, a set of candidate lattice points becomes $$Z_4^{(1)}$$

=$\{-3, -1, 3\}$. At this time, lattice point estimates from 2-dimension (second element of $$\hat{x})$$

to 8-dimension (eighth element of $$\hat{x})$$

are kept fixed.

First, a Euclidean distance between a received signal vector and a lattice vector is calculated when a candidate lattice point of the 1-dimension is −3

$$x_1^u = -3 ).$$

When the Euclidean distance $$r^u$$

is smaller than an initial radius $$r,$$

the initial radius $$r$$

is updated by the Euclidean distance $$r^u$$

obtained in a currently selected dimension, and the lattice vector becomes.

$$\hat{x} = \hat{x}^u = [-3, 3, -1, -1, 1, 2, -3, -1]^T.$$

At this time, only a lattice point estimate of the 1-dimension is modified.

In a manner like above, Euclidean distances between the received signal and the lattice vector are calculated when $$x_1^u = -1$$

and, $$x_1^u = 3,$$

respectively. When the calculated Euclidean distance is smaller than the updated initial radius, the updated initial radius is updated by the calculated Euclidean distance. Otherwise, the updated initial radius remains as it is.

In the case that the Euclidean distance between the received signal and the lattice vector becomes a minimum Euclidean distance and is shorter than the initial radius when, $$x_1^u = -1,$$

the initial radius r is updated by the minimum Euclidean distance obtained in the currently selected dimension and the lattice vector becomes.

$$\hat{x} = \hat{x}^u = [-1, 1, -1, -1, 1, 3, -3, -1]^T.$$

Herein, the lattice point estimate of the 1-dimension is modified.

Subsequently, search processing is performed on the 2-dimension while lattice point estimates of the 1-dimension and 3-dimension to 8-dimension are kept fixed. In the case of the 2-dimension, a lattice point estimate of the 2-dimension is currently set to 3, and accordingly, a set of candidate lattice points.

$$Z_4^{(2)}$$

=$\{-3, -1, 1\}$. Euclidean distances of the candidate lattice points are respectively obtained in a manner like the above. The Euclidean distance becomes minimum when.

$$x_2^u = -1.$$

However, when the minimum Euclidean distance is greater than the initial radius r updated in the 1-dimension, the lattice point estimate is not modified and accordingly the lattice vector remains to be.

$$\hat{x} = \hat{x}^u = [-1, 1, -1, -1, 1, 1, -3, -1]^T.$$

When the sequence of alternating one-dimensional search processes is performed from the 1-dimension to the 8-dimension, an initial radius obtained last is smaller than an initial radius obtained by using the MMSE estimate or ZF estimate such that an amount of computations during the tree-pruning process of the sphere decoder may be significantly reduced.

However, although lattice points are searched at a particular dimension and a lattice vector having a minimum Euclidean distance with a received signal vector is found such that a lattice point estimate of the corresponding dimension is modified according to the sequence of alternating search processes performed for reduction of an initial radius of the sphere decoder, the modified lattice point estimate may not correspond to a lattice point of a substantial ML estimate. When an incorrect lattice point is selected and the sequence of alternating one dimensional search processes is performed on a lower dimension, a lattice point estimate in a higher dimension may not be modified even though a minimum Euclidean distance is obtained from the lower dimension and the initial radius is updated by the minimum Euclidean distance.

For example, when a set of candidate lattice points of the 1-dimension of an 8-dimensional ZF estimate $$\hat{x} = [1, 3, -1, -1, 1, 3, -3, -1]^T$$

becomes $$Z_4^{(1)}$$

=$\{-3, -1, 3\}$ and the lattice vector $$\hat{x} = \hat{x}^u = [-1, 1, -1, -1, 1, 1, -1, -1]^T$$

having a Euclidean distance smaller than a current radius is obtained, the lattice point estimate of the 1-dimension is modified from 1 to −1. In addition, when a set of candidate lattice points of the 2-dimension is $$Z_4^{(2)}$$

=$\{-3, -1, 1\}$, , and a Euclidean distance is smaller than the radius updated in the 1-dimension, the lattice vector becomes.

$$\hat{x} = [-1, -1, -1, -1, 1, 3, -3, -1]^T.$$

However, when the lattice point estimates of the 1-dimension and 2-dimension of the ML estimates are respectively 3 and −1, the lattice point −1 of the 1-dimension may not be modified in lower dimensions any more because a lattice point in a lower dimension is searched after lattice points in higher dimensions is searched. This means that a lattice point in a relatively higher dimension may have great influence on obtaining a lattice vector having a minimum Euclidean distance.

There may be the possibility of modifying a lattice point that is incorrectly selected in a higher dimension when setting a smaller radius among two forward and backward radii as an initial radius, the two radii selected among radii obtained by performing the sequence of alternating one-dimensional search process using the ZF estimate of algorithm 1 in an ascending direction, from the 1-dimension to the 2N-dimension, and performing the process reusing the ZF estimate in a descending direction, from the 2N-dimension to the 1-dimension. Therefore, an initial radius obtained by performing the sequence of alternating one-dimensional search processes in bi-direction may be shorter than an initial radius obtained by performing the process in one-way (ascending direction or descending direction).

In addition, an estimate lattice vector obtained by performing the sequence of alternating one-dimensional search processes in the ascending direction may be used for the sequence of alternating one-dimensional search processes in the descending direction. Algorithm 2 represents a sequence of alternating one-dimensional search processes performed in bi-direction for searching an initial radius that is further reduced than the radius obtained through Algorithm 1.

$$\text{Initialize}(r_{fwd} = r, \hat{x}_{fwd} = \hat{x}) \qquad < \text{Algorithm 2} >$$

For $i = 1$ to $2N$ $$(\hat{x}^u, r^u_{fwd}) = \begin{pmatrix} \arg\min_{x_i^u \in Z_q^{(i)}} \|r - H\hat{x}_{fwd}^{(i)}\|, \\ \|r - H\hat{x}_{fwd}^{(i)}\| \end{pmatrix}$$

If $r^u_{fwd} < r_{fwd}$, then $(r_{fwd}, \hat{x}_{fwd}) = (r^u_{fwd}, \hat{x}^u)$ End Initialize $(r_{bwd} = r, \hat{x}_{bwd} = \hat{x})$ For $i = 2N$ to $1$ $$(\hat{x}^u, r^u_{bwd}) = \begin{pmatrix} \arg\min_{x_i^u \in Z_q^{(i)}} \|r - H\hat{x}_{bwd}^{(i)}\|, \\ \|r - H\hat{x}_{bwd}^{(i)}\| \end{pmatrix}$$

If $r^u_{bwd} < r_{bwd}$, then $(r_{bwd}, \hat{x}_{bwd}) = (r^u_{fwd}, \hat{x}^u)$ End $r = \min(r^u_{fwd}, r^u_{bwd})$ Such a sequence of alternating one-dimensional search processes may require additional computation for further reduction of an initial radius than that of an existing sphere decoder. However, since lattice point estimates of other dimensions are kept fixed while the sequence of alternating one-dimensional search processes is performed on a particular dimension, the process of Algorithm 1 may be simplified as Algorithm 3.

$$\text{Initialize}(r, \hat{x}), H = [h_1 \ldots h_{2N}], e^0 = r - H\hat{x} \qquad < \text{Algorithm 3} >$$

For $i = 1$ to $2N$ $e_f^{(i)} = e^0 + h_i \hat{x}_i$ $e_r^{(i)} = e_f^{(i)} - h_i x_i^u$ $(\hat{x}^u, r^u) = \left( \arg\min_{x_i^u \in Z_q^{(i)}} \|e_r^{(i)}\|, \|e_r^{(i)}\| \right)$ If $r^u < r$, then $(r, \hat{x}) = (r^u, \hat{x}^u)$ $e^0 = e_f^{(i)} - h_i \hat{x}_i^u$ End.

Algorithm 3 will now be described in more detail with reference to FIG. 7.

Figure 7:
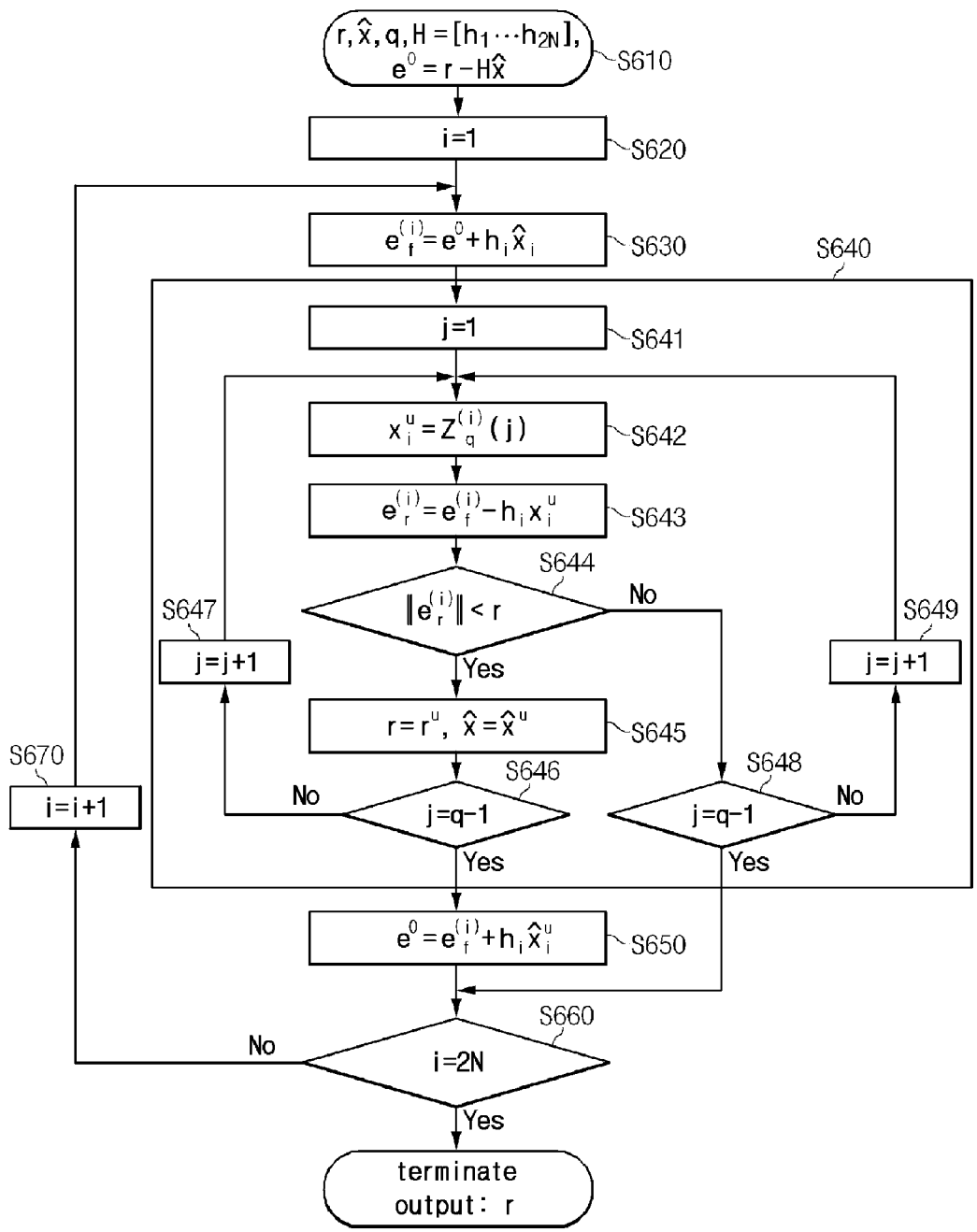
FIG. 7 illustrates an operation process of the initial radius reducing unit of FIG. 4.

FIG. 7 illustrates an operation process of an initial radius reducing unit 250 of FIG. 4 for Algorithm 3. In the following description, assuming that a communication system having four transmit antennas and four receive antennas and using a 16-QAM constellation obtains an initial radius r using a ZF estimate and performs a sequence of alternating one-dimensional search processes from 1-dimension to 8-dimension, the ZF estimate being given as an 8-dimensional real-valued vector.

$\hat{x} = [1,1,-1,-1,1,3,-3,-1]^T$.

As shown in FIG. 7, parameters including a real-valued vector e0 and a channel matrix H used for setting an initial radius are initialized in step S610 according to Algorithm 3. Subsequently, the following process is performed from 1-dimension (i=1) to 8-dimension (i=8) in order to search candidate lattice points.

First, 1-dimension is selected in step S620, and $h_i \hat{x}_i$ is added to the real-valued vector $e^0$ in order to eliminate information on a current lattice point, that is, lattice point estimate 1, for candidate lattice points in step S630.

When an initial estimate component is eliminated in such a way, a searching process is performed on candidate lattice points −3, −1, and 3, respectively, in step S640.

During the searching process, a first lattice point (j=1) is selected from among the candidate lattice points in steps S641 and S642, and information on the selected lattice point is inserted by subtracting.

$h_i x_i^u$.

A Euclidean distance between a received signal vector and the corresponding lattice vector is obtained if a replaced lattice point is −3, in step S643. Then, the Euclidean distance $r^u$ is compared to the initial radius r in step S644. If the Euclidean distance $r^u$ is smaller than the initial radius r, the initial radius r is updated by the Euclidean distance
$r^u$
that is obtained in a currently selected dimension, and the lattice vector is updated with $\hat{x} = \hat{x}^u = [-3,3,-1,-1,1,3,-3,-1]^T$ in step S645. Herein, the lattice point estimate of the 1-dimension is modified. Subsequently, a second lattice point (j=2) is selected from the candidate lattice points in steps S646 and S647, and the above-described process is repeatedly performed in steps S642 through S645.

However, if the Euclidean distance $r^u$ is greater than the initial radius r, the search process is considered to be a failure. Thus, the second lattice point (j=2) is selected from among the candidate lattice points in steps S648 and S649, and the above-described process is repeatedly performed through steps S642 to S645.

Subsequently, steps S642 to S645 are repeatedly performed on a third lattice point (j=3) so that a lattice vector having a minimum Euclidean distance and an initial radius are estimated by obtaining a Euclidean distance between the received signal vector and the corresponding lattice vector.

When all candidate lattice points of the 1-dimension are searched in such a way, an initial real-valued vector of the next dimension are provided by subtracting information on lattice points updated at the 1-dimension so as to keep information on the lattice point of the 1-dimension fixed in step S650 while the next steps S660 and S670 are being performed.

Subsequently, after selecting the 2-dimension, Euclidean distances of candidate lattice points at the 2-dimension are obtained by repeatedly performing the above-described steps S630 to S650, and a lattice vector and a radius are updated. A minimum initial radius is obtained by performing the sequence of alternating one-dimensional search processes from 1-dimension to 8-dimension $$(=2N=2\times 4)$$

in such a way.

In this instance, values of $$e_f^{(i)}$$

are kept fixed even though candidate lattice points of i-dimension are changed for the sequence of alternating one-dimensional search processes, and accordingly, computations of values in the i-dimension are not required and a process for obtaining a square root for a Euclidean distance are additionally required, thereby simplifying the sequence of alternating one-dimensional search processes in Algorithm 1.

Finally, an initial radius further reduced than an initial radius determined by the sphere decoder according to Algorithm 1 may be obtained by performing the simplified Algorithm 3 in bi-direction as shown in Algorithm 2. At this time, the setting order of descending direction may be independent to the setting order of ascending direction.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A sphere decoder for simultaneously detecting a plurality of symbols from a signal received through a communication channel, the sphere decoder comprising:

an initial estimation unit for obtaining an initial estimate of a transmitted symbol vector from the received signal;

an initial radius setting unit for calculating a Euclidean distance between a lattice vector corresponding to the initial estimate of the symbol vector and the received signal, and for setting the Euclidean distance as an initial radius;

an initial radius reduction unit for further reducing the initial radius before the lattice vectors are searched by the lattice search unit;

a lattice search unit for searching a set of candidate lattice vectors included inside a hypersphere with the initial radius, centered at a received signal vector; and a maximum likelihood estimate determination unit for selecting a lattice vector having a minimum Euclidean distance from the set of candidate lattice vectors, wherein the initial radius reduction unit:

a) selects one dimension;

b) searches all candidate lattice vectors except for a current estimate in the selected dimension, and obtains the corresponding minimum Euclidean distance and a lattice vector corresponding to the minimum Euclidean distance;

c) compares the minimum Euclidean distance and a current initial radius;

d) updates the current initial radius by the Euclidean distance and updates a current lattice point estimate by a lattice point estimate corresponding to the updated initial radius when the minimum Euclidean distance is smaller than the current initial radius; and e) repeatedly performs b) to d) by changing the dimension according to a particular order.

2. The sphere decoder of claim 1, wherein the initial radius reduction unit searches the best candidate lattice point at a selected dimension in terms Euclidean distance, provides the corresponding minimum Euclidean distance, and obtains a lattice vector corresponding to the minimum Euclidean distance.

3. The sphere decoder of claim 2, wherein the initial radius reduction unit keeps lattice-point estimates in all other dimensions fixed except for the selected dimension during searching the selected dimension.

4. The sphere decoder of claim 3, wherein the initial radius reduction unit updates an initial radius with the minimum Euclidean distance obtained in the selected dimension, and constructs a final lattice vector by combining a lattice point estimate corresponding to the updated initial radius with lattice point estimates of other dimensions.

5. The sphere decoder of claim 4, wherein the initial radius reduction unit repeatedly obtains a better minimum radius and a lattice vector corresponding to the minimum radius, up to the final lattice vector by changing the dimension according to a particular order.

6. The sphere decoder of claim 1, wherein the lattice search unit performs a searching process in descending order, from the highest dimension to the lowest dimension, and uses a tree-pruning method for deleting branches out of a hypersphere.

7. The sphere decoder of claim 1, wherein the initial estimation unit employs a Minimum Mean Square Error (MMSE) detection or a Zero Forcing (ZF) detection.

8. The decoding method of a sphere decoder for simultaneously detecting a plurality of symbols from a signal received through a communication channel, the method comprising:

obtaining an initial estimate of a symbol vector from the received signal;

obtaining a Euclidean distance between a lattice vector corresponding to the initial estimate and the received signal, and setting the Euclidean distance as an initial radius;

reducing the initial radius by using an initial estimate and the initial radius before searching the lattice vectors searching a set of candidate lattice vector included inside a hypersphere with the initial radius, centered at a received signal vector; and selecting one lattice vector having a minimum Euclidean distance from the set of candidate lattice vectors, wherein the reducing of the initial radius comprises:

a) selecting one dimension;

b) searching all candidate lattice vectors except for a current estimate in the selected dimension, and obtaining the corresponding minimum Euclidean distance and a lattice vector corresponding to the minimum Euclidean distance;

c) comparing the minimum Euclidean distance and a current initial radius;

d) updating the current initial radius by the Euclidean distance and updating a current lattice point estimate by a lattice point estimate corresponding to the updated initial radius when the minimum Euclidean distance is smaller than the current initial radius; and
e) repeatedly performing b) to d) by changing the dimension according to a particular order.

9. The decoding method of claim 8, wherein lattice point estimates of all other dimensions are kept fixed except for the selected dimension.

10. The decoding method of claim 8, wherein in e), a sequence of alternating one-dimensional search processes is performed from the lowest dimension to the highest dimension.

11. The decoding method of claim 8, wherein in e), a sequence of one-dimensional search processes is performed from the highest dimension to the lowest dimension.

12. The decoding method of claim 8, wherein in e), a sequence of one-dimensional search processes is performed from the highest dimension to the lowest dimension, and then performed again from the highest dimension to the lowest dimension using a result of the process performed from the highest dimension to the lowest dimension.

* * * * *